Jan. 30, 1945.  V. CARUSO  2,368,344
DRAFTSMAN'S TRIANGLE
Filed Feb. 13, 1943
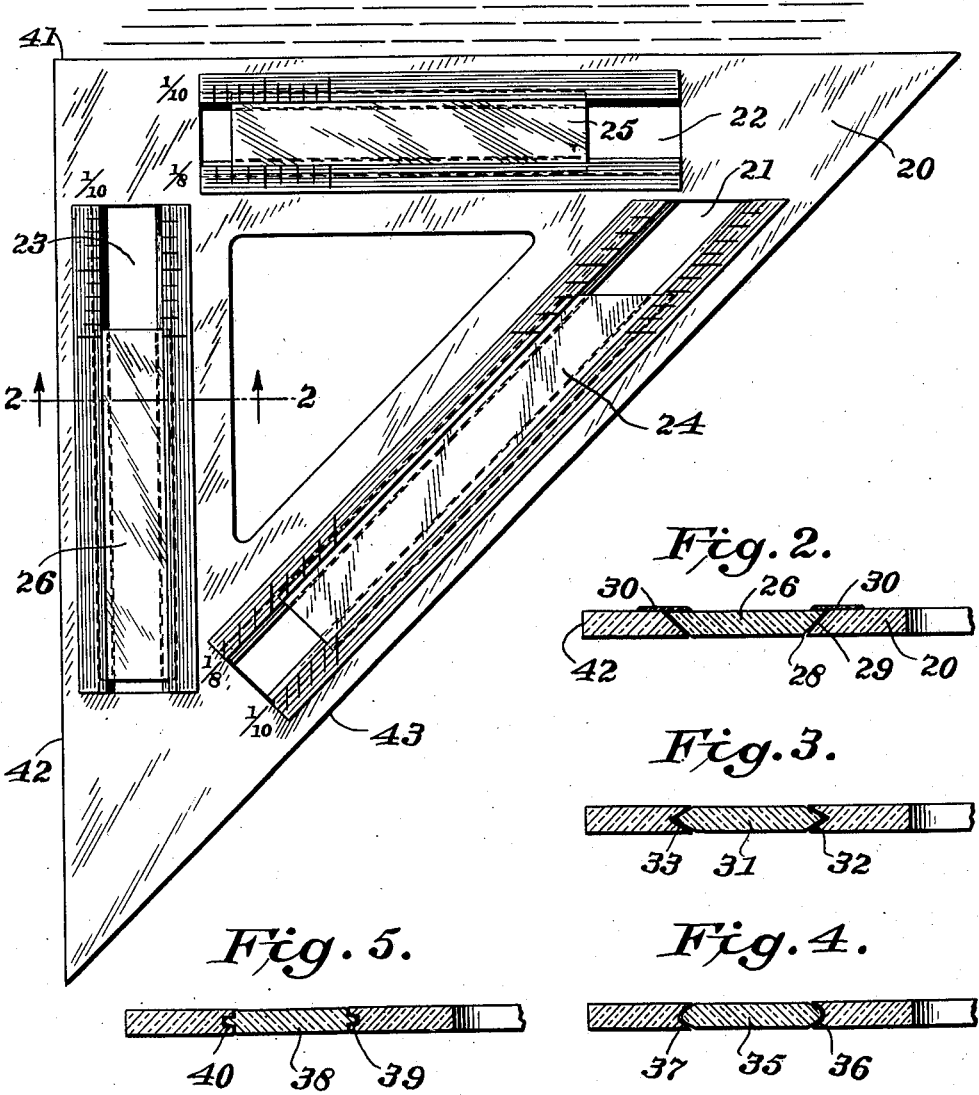

Patented Jan. 30, 1945

2,368,344

UNITED STATES PATENT OFFICE 2,368,344

DRAFTSMAN'S TRIANGLE

Vincent Caruso, Beltsville, Md., assignor of one-half to Abe Murdock, Beaver, Utah Application February 13, 1943, Serial No. 475,820

3 Claims. (Cl. 33—110)

The present invention relates to a draftsman's triangle and more particularly to a triangle especially designed to enable the drawing of parallel lines, geometrical figures, or the like, without the use of any additional equipment.

It is a principal object of my invention to provide a draftsman's triangle having at least one of its sides provided with a slide positioned within an elongated slot parallel to and adjacent the triangle side, by means of which the triangle may be used to draw parallel lines, geometrical figures, or the like.

I am aware of previous attempts in the art to provide a draftsman's triangle with a slide disposed within a slot parallel to and adjacent one of the triangle sides, but to the best of my knowledge, all of the previous attempts in the art employed a slide of adjustable length. These slides of adjustable length were necessarily provided with projections extending from one of the faces of the slide to facilitate the adjustment of the length. Because of these projections, it was impossible to use the triangle with either of its faces placed against the paper to draw parallel lines or the like.

It is, therefore, an important object of the present invention to provide a draftsman's triangle having at least one of its sides provided with a slide having no projections and of fixed length positioned within an elongated slot parallel to and adjacent the triangle side, thus permitting the use of the triangle with either of its faces placed against the paper.

It is a further object of the present invention to provide a draftsman's triangle having at least one of its sides provided with a slide positioned within an elongated slot parallel to and adjacent the triangle side and having scale indicia in association with the longitudinal edges of the slide and slot for indicating the relative movement of the slide and the triangle.

It is a still further objection of my invention to provide a draftsman's triangle having a slide positioned within an elongated slot parallel to and adjacent each side of the triangle and including scale indicia relative to the longitudinal edges of the slides and slots to indicate the relative movement between the slides and slots, the scale indicia being so arranged as to permit the drawing of parallel lines, squares, geometrical figures, or the like, without the use of any additional equipment.

It is also an object of my invention to provide a draftsman's triangle having at least one of its sides provided with a slide positioned within an elongated slot parallel to and adjacent the triangle side and having means for indicating the relative movement of the slide and triangle, whereby parallel lines may be drawn and accurately spaced to any desired scale.

Further objects and advantages of my invention will be readily apparent by reference to the following specification and drawing in which:

Figure 1 is a plan view of the draftsman's triangle of my invention;

Figure 2 is a cross-sectional view, taken on the lines 2—2 of Figure 1, showing the preferred arrangement for mounting the slide within the triangle slot, and Figures 3, 4, and 5 are cross-sectional views similar to Figure 2 and each showing a modified arrangement for mounting the slide within the triangle slot.

Referring to Figure 1 of the drawing, the numeral 20 denotes a draftsman's triangle which may be constructed according to the customary practice of Celluloid or any other desired material. The triangle of my invention, however, is provided with at least one elongated slot parallel to and adjacent a side of the triangle. I have shown in Figure 1, a triangle provided with a slot 21 parallel to the hypothenuse side of the triangle, a slot 22 parallel to the altitude side of the triangle, and a slot 23 parallel to the base side of the triangle. Carried by the triangle and freely slidable within each slot are the slides 24, 25, and 26. These slides are fixed in length to a length substantially less than that of the slot in which each slide is positioned. The slides 24, 25, and 26 are of the same thickness as the triangle 20. In referring to the thickness of the triangle, I intend to denote the thickness of the triangle between its face surfaces. I prefer to construct the slides of the same material as the material of which the triangle 20 is formed, and in the present form of the invention, this material will be Celluloid.

Scale indicia are provided in association with each slot and slide to indicate the relative movement between each slot and slide. I have shown two different scale indicia in association with each slot and slide, such as a scale of one-tenth of an inch adjacent one side of the slot and slide, and a scale indicia of one-eighth of an inch adjacent the other side of the slot and slide. It should be noted that the scale indicia in association with the slot 21 and slide 24 parallel to the hypothenuse side of the triangle represents a projection of the scale indicia in association with the slots and slides parallel to the other sides of the triangle. At the base end of the hypotenuse slot, the scale indicia are a projection of the indicia in association with the slide 26 and the altitude slot 22, whereas the scale indicia in association with the altitude end of the hypotenuse slot and slide are a projection of the scale indicia in association with the base slot 23 and slide 26. This form of indicia, in association with the hypotenuse slot and slide, facilitate the use of the triangle of my invention when it is desired to draw geometrical figures, such as squares, rectangles, or the like.

I prefer to mount the slide within the slot by means of a tongue and groove joint, so that each slide will be freely slidable within each slot. My preferred form of tongue and groove joint for permanently positioning the slide within the slot is shown in cross-section in Figure 2 of the drawing. The slide 26, as shown in Figure 2 of the drawing, is provided with a beveled edge 28 which is adapted to engage a similar beveled edge 29 on the sides of the triangle slot. The slide 26 is placed within the slot, as shown in Figure 2 of the drawing, and a paper-thin strip of Celluloid or other suitable material 30 is joined to the top face of the triangle in overlaying relation to the slide 26 and the edge 29 of the triangle slot, thus, in effect, providing a tongue and a groove joint between the slide 26 and the triangle 20. It should be noted that the locking strip 30 is joined to the top face of the triangle at which the slot is widest, due to the beveled edge 29. The beveled edge 29 prevents the movement of the slide in a direction at right angles to the bottom face of the triangle, while the locking strip 30 prevents the movement of the slide in a direction at right angles to the top face of the triangle at which the slot is widest, thus slidably positioning and locking the slide 26 within the slot of the triangle. In the preferred form of my invention, as shown in Figures 1 and 2 of the drawing, the scale indicia, in association with each slot and slide, are placed on the locking strip 30, thus avoiding the necessity of marking the scale indicia upon either the slot edges of the triangle or the slide.

While I have described above and shown in Figure 2 of the drawing, the preferred form of tongue and groove joint between the slide and slot, I may also use, for certain purposes, the modified types of tongue and groove joints shown in Figures 3, 4, and 5 of the drawing. In Figure 3 of the drawing, the slide 31 is provided with V-shaped edges 32 which interfit with the V-shaped edges 33 of the triangle slot. In the modified form shown in Figure 4, the slide 35 is provided with the rounded edges 36 interfitting with the rounded edges 37 of the triangle, while in the modified form shown in Figure 5 of the drawing, the slide 38 is provided with a shoulder 39 interfitting within the groove 40 of the triangle slot. All of these forms of the invention constitute various modified types of tongue and groove joints, and I do not wish to limit my invention to any one form of joint.

In using the draftman's triangle of my invention, it will be apparent that the triangle may be used on either of its faces, in view of the fact that the slide is of the same thickness as the triangle and does not have any projections or adjustments extending from either of its faces. To draw parallel horizontal lines, the triangle is placed upon the drawing paper in the manner shown in Figure 1 of the drawing with the altitude side in a horizontal position. The slide 26 adjacent the base side of the triangle is moved within its slot 23 to the slot's extreme end nearest the altitude side of the triangle. A line is then drawn from the altitude side. The draftsman then moves the slide 26 the desired spacing distance for the parallel lines, as indicated upon the scale indicia in association with the slide 26 and slot 23. After moving the slide 26, the draftsman places his finger upon said slide and moves the triangle relative to the slide until the end of the slide again abuts the end of the slot 23 nearest to the altitude side. An additional line is then drawn from the altitude side 41 which will be parallel to the original line and spaced any desired distance as indicated by the relative movement of the slide 26 and the scale indicia in association therewith.

As an alternate method, the slide 26 may be moved to the extreme end of its slot 23 nearest the hypotenuse side of the triangle. After a line is drawn from the altitude side, the triangle may be moved relative to the slide 26 to the desired distance as indicated by the scale indicia in association with the slot 23 and slide 26. An additional line is then drawn from the altitude side 41, thus creating parallel lines accurately spaced with relation to each other.

It should be obvious that other procedures in using the triangle of my invention may be employed to draw parallel lines when desired. I wish to emphasize, however, that it is an important advantage of my invention that the triangle may be accurately moved to space parallel lines to any desired distance, without resorting to fine adjustments of the length of the slide being used, due to the fact that the slide is fixed to a length considerably less than the length of the slot, and that a plurality of scale indicia for indicating the relative movement of the slide and slot are provided.

When it is desired to draw a geometrical figure, such as a square or a rectangle, two parallel lines are drawn from the base side 42 and accurately spaced by means of the slide and slot adjacent the hypotenuse side 43 of the triangle. Intersecting parallel oblique lines are then drawn from the altitude side 41 of the triangle and accurately spaced by means of the slide and slot parallel to the hypotenuse side 43 of the triangle, and it will be readily seen that by spacing the intersecting parallel lines the same as the original parallel lines, a square will be drawn. By spacing the intersecting parallel lines to a greater or lesser extent than the spacing of the original parallel lines, a rectangle will be drawn.

Other uses of the triangle of my invention not described above, such as drawing geometrical figures, extending lines, and drawing various parallel lines, will also be readily apparent to those skilled in the art.

By my invention, I have provided a draftsman's triangle which may be used on either of its faces, without the need of any additional equipment to draw parallel lines, geometrical figures, or the like. While I have shown and specifically described the positioning of scale indicia upon the locking strip 30, it will be obvious that the invention is capable of modification, within the scope of the appended claims, to include scale indicia on either the slide or the edges of the slot for indicating the relative movement of the slide and slot. I have also shown and described specific scale indicia such as one-eighth or one-tenth of an inch, but it should be obvious that any desired scale indicia may be used on either side of the slots and slides.

It should also be understood that while I have described a triangle having a slot adjacent each of its sides and provided with a slide positioned within each slot, what I claim as new is a triangle having at least one of its sides provided with a slot in which is slidably positioned a slide of less length than the slot, the slide being of the same thickness as the triangle and having no projections, whereby the triangle may be used on either of its faces.

I claim:

1. A draftsman's triangle having each of its sides provided with an elongated slot, a slide carried by the triangle and freely slidable within each slot, each slide being of substantially less length than its associated slot, scaled indicia in association with each slot and slide for indicating the relative movement between each slot and slide, the indicia in association with the base end of the hypotenuse slot being a projection of the indicia in association with the altitude slot and the indicia in association with the altitude end of the hypotenuse slot beng a projection of the indicia in association with the base slot.

2. A draftsman's triangle having at least one of its sides provided with an elongated slot, the longitudinal edges of said slot being bevelled so that the slot is wider at the top face of the triangle, a slide of less length than the slot and of substantially the same thickness as the thickness of the triangle, said slide carried by the triangle and freely slidable within the slot, the longitudinal edges of said slide being bevelled and adapted to interfit with the bevelled longitudinal edges of the triangle slot, and a locking strip attached to the top face of the triangle and overlaying the longitudinal edges of the slot and slide, said locking strip being provided with indicia on its surface to indicate the relative movement of the slot and slide.

3. A draftsman's triangle provided with a slot extending parallel to one edge of the triangle, a slide of less length than the slot disposed flushly therein, the longitudinal edges of the slide and slot being complementarily formed so as to hold the slide against displacement in one direction out of flush relation, and strip means secured to the triangle and overlying the slide marginally so as to hold the slide against displacement in the other direction out of flush relation.

VINCENT CARUSO.